Nov. 9, 1926. 1,606,715
W. J. MILLER
VALVE
Filed April 5, 1926

WITNESSES
Fred B. Aebly
J. Twcauliffs

INVENTOR
W. J. MILLER
BY
ATTORNEYS

Patented Nov. 9, 1926.

1,606,715

UNITED STATES PATENT OFFICE.

WILLIAM J. MILLER, OF WALLER, TEXAS.

VALVE.

Application filed April 5, 1926. Serial No. 99,850.

My invention relates to a valve which may be in the form of a gate valve or globe valve and particularly the invention relates to valves employed in gas wells, oil wells and other situations where the fluid is under pressure and liable to leak.

In the case of a valve employed on an apparatus for oil wells or gas wells, leakage is liable to occur between the valve body and the bonnet as well as between the valve bonnet and the stuffing box and elsewhere. It is a matter of concern when leakage occurs because it is important that the valve be not closed to cut off the flow.

The general object of my invention is to provide a valve provided with means whereby the leaking fluid may be confined and directed to the desired point of discharge and thereby the leaking fluid may be taken care of by directing it to a distant point or by confining within the housing until such times as the operations of the well will permit of the proper repair of the valve.

The nature of my invention, its distinguishing features and advantages will clearly appear as the description proceeds.

Reference is to be had to the accompanying drawings forming a part of this specification, it being understood that the drawings are merely illustrative of one example of the invention.

In the illustrated example of my invention, the numeral 10 indicates a body of a gate valve but the invention is not confined to embodiment in gate valves. 11 indicates the valve bonnet, the body and the bonnet having flanges 12 united by bolts 13. The numeral 14 indicates a stuffing box on the valve bonnet and 15 the end of the valve stem.

Figure 3:
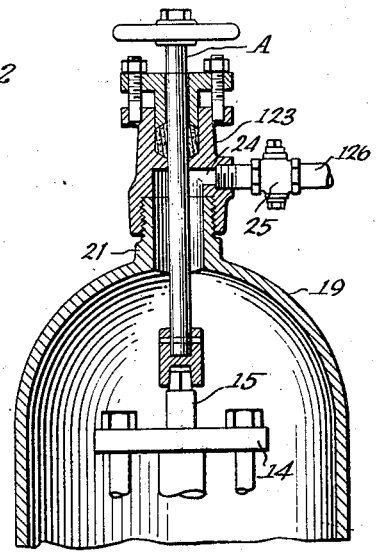
Figure 3 is a fragmentary vertical section illustrating a modified manner of carrying out the invention.

In accordance with my invention, I provide on the valve body an annular zone 16 advantageously the valve body being thickened at said zone to produce strength. The annular member 16 thus presented by the valve has either external or internal threads, and preferably both, the exterior threads being indicated by the numeral 17 and the internal threads by the numeral 18. I provide a hood or housing 19, hereinafter, for convenience, termed a hood and said hood has internal threads 119 to engage the threads 17. Also, I prefer to employ a second hood 20 having at its lower end external threads 120 to engage the internal threads 18 on the valve body. Either one or both of the hoods 19 and 20 may be employed and by securing them to the valve body in the manner referred to, the valve bonnet is prevented from being damaged by handling or blows and also should one hood become damaged at the threads, for example, the other one may be immediately utilized. The one hood, 19, has an externally threaded nipple 21 and the other hood, 20, has an externally threaded nipple 22, whereby to engage the threads on an auxiliary gate valve 23, as in Figure 1, or a stuffing box 123 as in Figure 3.

Figure 1:
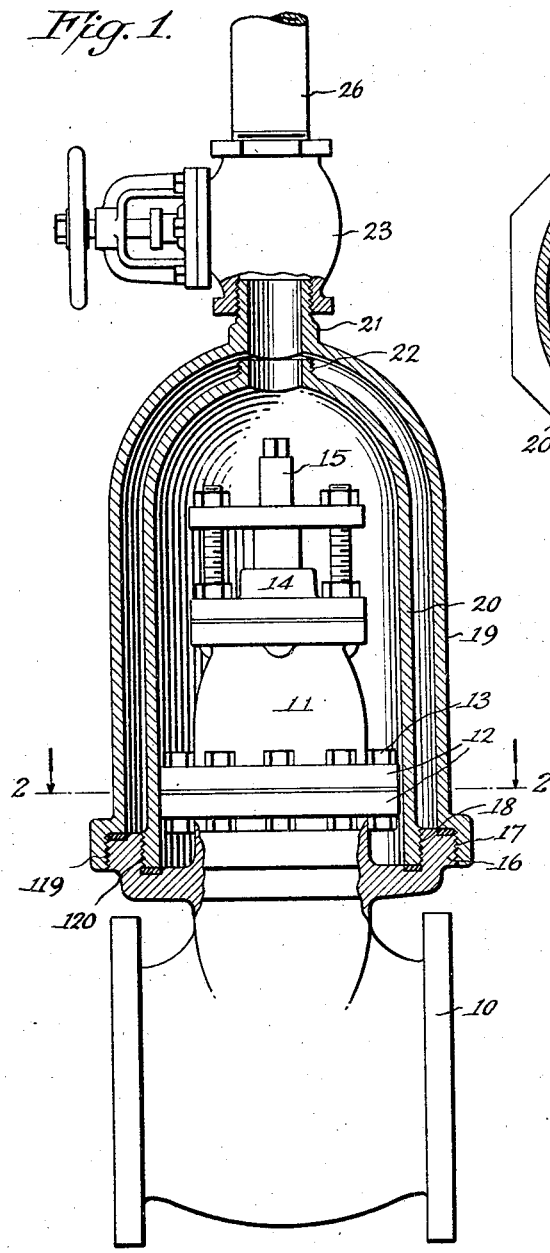
Figure 1 is a view partly in section and partly in side elevation showing a valve embodying my invention.
Figure 2:
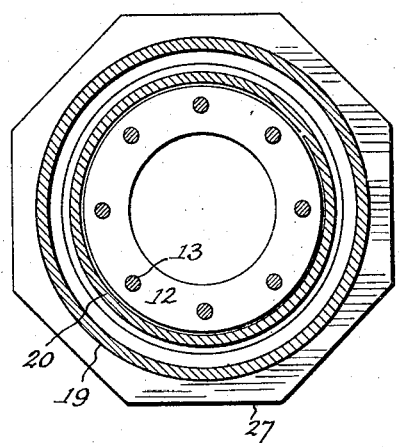
Figure 2 is a horizontal section on the line 2—2, Figure 1.

In the assemblage of the construction shown in Figure 1, the pipe 26 may conduct off any leakage escaping into the housing 19 or 20 assuming only one of the same is in position, and with the gate valve 23 open, the fluid will pass through the pipe 26 or said pipe 26 may be removed and a valve tool or wrench applied to the valve stem 15 for closing the valve 10. In the assemblage shown in Figure 3, the stuffing box 123 has an outlet 24 to which a pipe 126 may be secured to conduct off the leakage. The pipe 126 is shown with a controlling valve 25.

In practice, should leakage occur at the joint between the valve body and bonnet or elsewhere above the valve body, and it is desired to use the inner hood 20, the hood 19 is removed and the valve 23 is applied to the nipple 22. If it is desired to utilize the hood 19, the hood 20 may be removed. With the valve 23 on either hood and said hood secured to the annular member 16, the fluid leaking from the valve will be confined by the hood and will pass through the nipple of the hood and through the valve 23 if said valve is employed, or to the stuffing box 123 and pipe 126, if the latter be employed. It will now be seen that leakage may be taken care of and directed to any point desired by the pipe 26 or 126. When occasion offers, the valve may be restored to its proper condition by removing the pipe 26 and the wrench A shown in Figure 3 or equivalent tool inserted through the nipple of the hood and engaged with the valve stem 15 for closing the valve 10.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a valve a valve body and a valve stem, a hood adapted to cover the joints of the valve body and of the valve stem, coacting means on the valve body and on said hood to detachably secure the hood to said body, a nipple on said hood affording an outlet for the outflow of leaking fluid and affording an inlet for a tool to engage the valve stem, and a fitting detachably secured to said nipple and permitting the passage of the fluid.

2. In a valve, a valve body having a threaded zone, a hood having threads to detachably engage said threaded zone, said hood enclosing a portion of the valve body and forming a fluid-tight cover for the portions of the valve liable to leakage, and adapted for the connection of means to conduct off any fluid leaking to the hood.

3. In a valve, a valve body having an annular member thereon surrounding an opening through the body and formed with internal and external threads, hoods adapted to respectively engage said threads, one hood fitting within the other, said hoods each having an opening, and means on the hood to afford a connection for means to conduct off any fluid leaking from the valve.

4. In a valve, a valve body having an annular member surrounding an opening through the valve body and adapted to enclose a valve bonnet, and formed with internal and external threads, either of which is adapted for the attachment of a hood.

WILLIAM J. MILLER.